(No Model.)

S. J. KURTZ.
VEHICLE AXLE.

No. 390,482. Patented Oct. 2, 1888.

WITNESSES
Frank A. Ober.
C. E. Doyle.

INVENTOR
Samuel J. Kurtz.
by
Attorneys.

UNITED STATES PATENT OFFICE.

SAMUEL J. KURTZ, OF CROOKED HILL, PENNSYLVANIA.

VEHICLE-AXLE.

SPECIFICATION forming part of Letters Patent No. 390,482, dated October 2, 1888.

Application filed June 23, 1888. Serial No. 278,026. (No model.)

*To all whom it may concern:*

Be it known that I, SAMUEL J. KURTZ, a citizen of the United States, residing at Crooked Hill, in the county of Montgomery and State of Pennsylvania, have invented a new and useful Improvement in Vehicle-Axles, of which the following is a specification.

The invention relates to improvements in vehicle-axles of the class that have detachable spindles; and its object is to provide simple and effective means to connect the spindles to the axle, whereby, when a spindle is broken, it may be easily and quickly replaced with little expense. Obviously the spindle is more liable to be broken or bent by a strain on the wheel than the axle proper, and it is evidently easier and cheaper to replace a single spindle when damaged than to replace the entire axle.

The invention consists in the construction and novel combination of parts hereinafter described, illustrated in the accompanying drawings, and pointed out in the appended claims.

Figure 1:
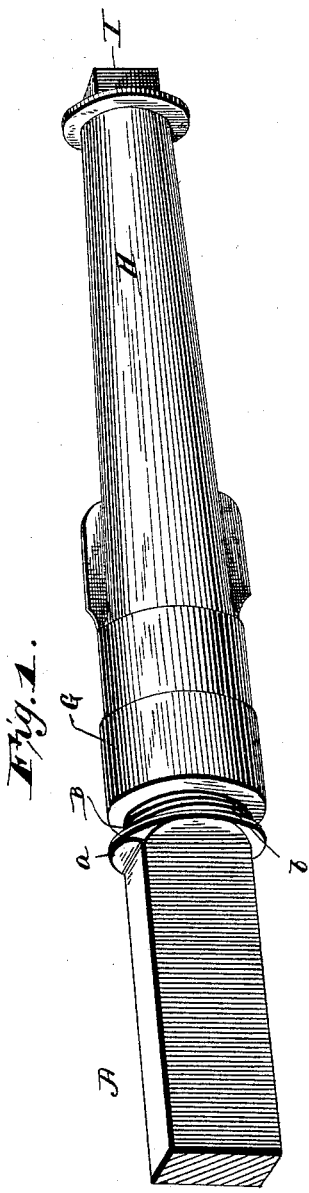
Figure 2:
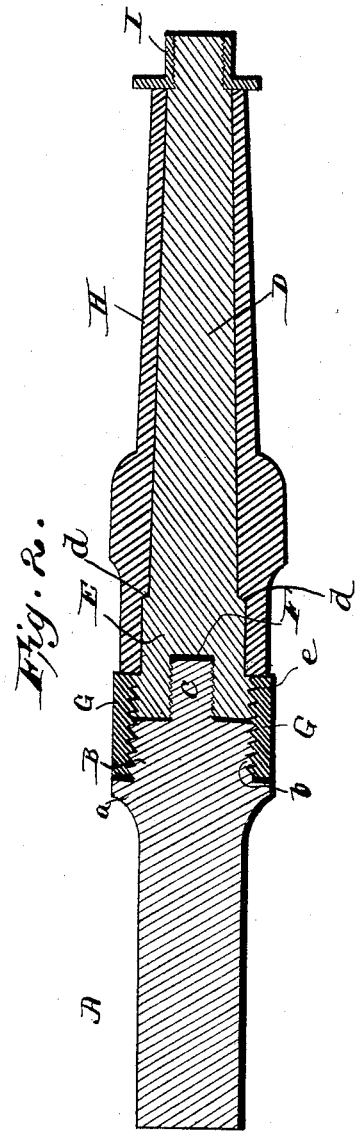

Figure 1 of the drawings represents a perspective view of one end of an axle embodying the invention. Fig. 2 represents a longitudinal section thereof.

Referring to the drawings by letter, A designates the axle of a vehicle, all parts of which are solid and integral, and which has near each end a circumferential shoulder, $a$, the axle between said shoulders being either rectangular or circular in cross-section.

The enlarged portions B of the axle just outside of said shoulders are cylindrical and provided with the threads $b$, and at the center of the end of said enlargement B is arranged the reduced threaded stud C, integral with the axle.

D D are spindles, each of which preferably tapers outwardly and has on its inner end a cylindrical enlargement, E, of equal diameter to the adjacent enlargement B of the axle and provided with threads $e$, which, when the spindle is arranged at the end of the axle, register with and continue the threads $b$ of the adjacent enlargement B. This enlargement is provided at its outer end with a shoulder, $d$.

F is a threaded recess in the inner end of the spindle, into which recess the threaded stud C of the axle fits and engages, and when the said parts are so engaged the corresponding enlargements, B and E, have their threads $b$ and $e$ continuous.

G is a threaded sleeve which screws upon said continuous threads and connects firmly the spindle and corresponding end of the axle, the inner edge of the said sleeve bearing against the corresponding shoulder, $a$, of the axle, thus making the parts compact, with the threaded integral stud of the axle locked within the threaded recess of the spindle.

H is a journal-box preferably tapered and fitting upon the spindle D at one end of the axle, which journal-box is fitted within the hub of a wheel, and I is a nut engaging the threaded end of the journal and keeping the said journal-box securely in place. The outer end of the sleeve forms a shoulder, against which the inner end of the journal-box bears. The said journal-box and nut form no part of the invention, as they are common to all axles of similar construction. The threads on the stud C are much smaller and finer than the threads $b$ and $e$, so that when the sleeve is secured on the last-named thread the spindle is locked against rotation. Therefore, in order to remove the spindle it is first necessary to unscrew the sleeve, after which the spindle may be unscrewed from the stud C.

Further, the spindle may, if desired, be adjusted out to bring the wheels at equal distances from the body of the vehicle by separating the enlargement, the sleeve forming a perfect lock to prevent displacement of the spindle.

When the threaded recess in the inner end of the spindle is adjusted on the threaded stud on the outer end of the axle, the end of the enlargement on the spindle is preferably jammed tightly against the enlargement on the axle, so that a transverse strain on the spindle will cause a longitudinal or tensile strain on the threaded stud, owing to the fact that the shoulders formed by the contacting ends of the enlargements form a fulcrum which connects the transverse into a longitudinal or tensile strain. It is obvious that the stud will withstand a much greater strain in a longitudinal direction than it will in a lateral direction, and therefore the spindle will be broken before the stud is seriously affected. The stud is still further insured against strain by the threaded sleeve which covers the joint between the contiguous faces of the enlargements B E, and prevents their separation, it being evident that the stud cannot be strained transversely, or, in fact, longitudinally, until the adjacent faces of the enlargements become slightly separated.

From the above description it will be seen that the purpose of the invention is to provide means to connect the removable spindle to the axle, whereby a lateral strain on the former, if sufficient to cause disruption, will break the spindle, which may be readily replaced, whereas the axle and the parts thereof to which the spindle is connected are protected from strain.

I am aware that axles having detachable spindles have heretofore been used, and it is therefore not my intention to claim this, broadly; but it is the purpose of the present invention to provide means for connecting the spindle to the axle, which means are firmly locked in place to prevent them from being jarred loose and releasing the spindle. It is my intention, further, to provide means for accomplishing this purpose, which shall consist of as few separable parts as possible, whereby the invention may be cheaply manufactured.

Having described my invention, I claim—

1. A vehicle-axle provided at its extremity with a projecting concentric threaded stud, C, in combination with the spindle provided at its inner end with a tapped recess, F, screwed on the stud C, and having an enlargement which bears against and corresponds in size with the adjacent portion of the axle, and the sleeve encircling and fitting tightly on the enlargement and the adjacent portion of the axle and covering the joint between the same, whereby transverse strain on the axle will cause tensile strain on the stud C, substantially as specified.

2. A vehicle-axle having a circumferential shoulder, $a$, a threaded enlargement, B, and a stud, C, concentric with the enlargement and provided with threads which are finer than those of the enlargement, in combination with the spindle D, provided with a threaded recess, F, fitting on the threaded stud C, and having an enlargement, E, which bears against the enlargement B and is provided with threads which continue the threads of the enlargement B, and the threaded sleeve G, screwed on the threaded contiguous enlargements, whereby the joint between them is covered, and bearing at its inner end against the shoulder $a$, substantially as specified.

In testimony that I claim the foregoing as my own I have hereto affixed my signature in presence of two witnesses.

SAML. J. KURTZ.

Witnesses:
HILTON S. BINDER,
L. H. DAVIS.